United States Patent [19]

Ishikawa et al.

[11] 4,225,902
[45] Sep. 30, 1980

[54] HEADLIGHT BEAM CONTROL SYSTEM FOR MOTOR VEHICLES

[76] Inventors: Masao Ishikawa, No. 3-5-20, Nakahara Isogo-ku, Yokohama; Orii Shinichi, No. 4-6-20 Fujigaya, Kugenuma, Fujisawa, both of Japan

[21] Appl. No.: 835,231

[22] Filed: Sep. 21, 1977

[30] Foreign Application Priority Data

Sep. 24, 1976 [JP] Japan ................................ 51/129137

[51] Int. Cl.² ............................................. B60Q 1/06
[52] U.S. Cl. ...................................... 362/40; 362/43; 362/47; 362/52; 362/57; 362/60
[58] Field of Search ...................... 362/40, 49, 50, 51, 362/52, 66, 67, 69, 71, 233, 250, 269, 272, 420, 425, 427–428, 43, 47, 60; 74/53, 54, 55, 57, 47, 25

[56] References Cited

U.S. PATENT DOCUMENTS

| 1,642,259 | 9/1927 | Morse | 74/47 |
|---|---|---|---|
| 1,891,791 | 12/1932 | Wiseman | 362/60 |
| 3,030,460 | 4/1962 | Huetten | 200/11 DA |
| 3,207,891 | 9/1965 | Eberle | 362/71 |
| 3,263,512 | 8/1966 | Handley | 74/53 |
| 4,069,724 | 1/1978 | Sobotta | 74/54 |
| 4,110,819 | 8/1978 | Ishikawa | 362/40 |

FOREIGN PATENT DOCUMENTS

| 2637326 | 3/1977 | Fed. Rep. of Germany . | |
| 1134265 | 4/1957 | France . | |
| 1183413 | 3/1970 | United Kingdom | 74/54 |

Primary Examiner—Samuel W. Engle
Assistant Examiner—Edward F. Miles
Attorney, Agent, or Firm—Schwartz, Jeffery, Schwaab, Mack, Blumenthal & Koch

[57] ABSTRACT

A motor vehicle comprises a pivotal support member having at least one headlamp secured thereto, an unidirectional motor which rotates its output shaft in one rotational direction only when energized, cam and linkage means whereby rotation of the output shaft of the motor is converted into a pivotal movement of the support member about its pivot axis to adjust the headlight angles. Also provided is an electric circuit for energizing the motor which comprises a first group of electrical contacts which are connected in series with a second group of electrical contacts, respectively, a contact disc in slidable engagement with the second group of electrical contacts, and a manually operable means for selectively connecting one of the first group of electrical contacts to a battery. The contact disc is electrically connected in series with the motor and also mechanically connected to the output shaft of the motor to be rotated thereby. It has means, in the form of a notch, for insulating the second group of electrical contacts one after another from the contact disc as it rotates.

2 Claims, 13 Drawing Figures

HEADLIGHT BEAM CONTROL SYSTEM FOR MOTOR VEHICLES

RELATED APPLICATION

U.S. patent application Ser. No. 740,711, now U.S. Pat. No. 4,110,819, filed Nov. 10, 1976 by Masao ISHIKAWA for "HEADLIGHT TILTING CONTROL DEVICE OF MOTOR VEHICLE," discloses a headlight beam control system in which a beam of each of headlights is adjusted to one of a predetermined positions as angled from the horizontal of a vehicle body by a mechanical linkage having its manually operable lever disposed within a passenger compartment.

BACKGROUND OF THE INVENTION

The present invention relates to motor vehicles and more particularly to headlight beam control systems of motor vehicles, in which a beam of each headlight is selectively adjustable to one of a plurality of predetermined positions as angled from the horizonal of a vehicle body under the control of a manually operable controller mounted within the vehicle passenger compartment.

Conventionally, it is proposed, for the purpose of reducing accident due to dazzling of a driver of an oncoming vehicle, to provide a headlight beam control system in which the inclination of a vehicle body relative to the road surface is detected by measuring a distance between the vehicle body and a front axle and a distance between the vehicle body and a rear axle, and a beam of each headlight is automatically adjusted to an appropriate one of a plurality predetermined positions as angled from the horizontal of the vehicle body in response to the detected vehicle body inclination. Such an automatic headlight beam control system, however, has a disadvantage that a device employed in the system to detect the inclination of the vehicle body, which stretches from the front axle to the rear axle, is bulky, heavy in weight and expensive. Therefore, such a bulky system that uses this kind of detecting device is not suitable for passenger automobiles in which variation of the vehicle inclination ranges from 0.04 to 0.05 in terms of tan $\theta$. Accordingly, in the case of passenger automobiles, the objective to control a beam of each headlight so as to prevent dazzling of a driver of an oncoming vehicle could be accomplished by adjusting each headlight angularly under the control of a manually operable controller mounted within a passenger compartment.

Based on this recognition it has been proposed by the applicants of this application to adjust a beam of each headlight to one of a plurality predetermined angular positions (as angled from the vehicle body's horizontal) in response to a selected one of a plurality, corresponding in number to the plurality of angular positions, positions of a manually operable controller via a suitable mechanism. With this proposal, since the use of a device, as described above, to detect the inclination of a vehicle body is eliminated, a headlight beam control system of a simple construction and of an accurate operation can be provided.

One of systems embodying this proposal has two drive motors disposed adjacent right and left headlight assemblies, respectively, to move the headlights angularly via respective linkages. The fact that two drive motors are needed is inferior in construction and cost. Besides, it is difficult to find enough room adjacent the headlight assemblies for installation of these motors. To avoid the latter mentioned problem, it is possible to replace these two motors with a single two-directional drive motor remotely installed from and operatively connected (via a wire and pulley linkage) to headlight. This, however, has a problem that the two-directional drive motor is expensive.

SUMMARY OF THE INVENTION

It is therefore an object of the present invention to provide a headlight beam control system of a simple and less expensive construction using a single unidirectional electric drive motor.

BRIEF DESCRIPTION OF DRAWINGS

Preferred embodiments of the present invention are described with reference to the accompanying drawings, in which

FIG. 3b is a section on the line B—B shown in FIG. 3a;

DESCRIPTION OF PREFERRED EMBODIMENTS

Figure 1:
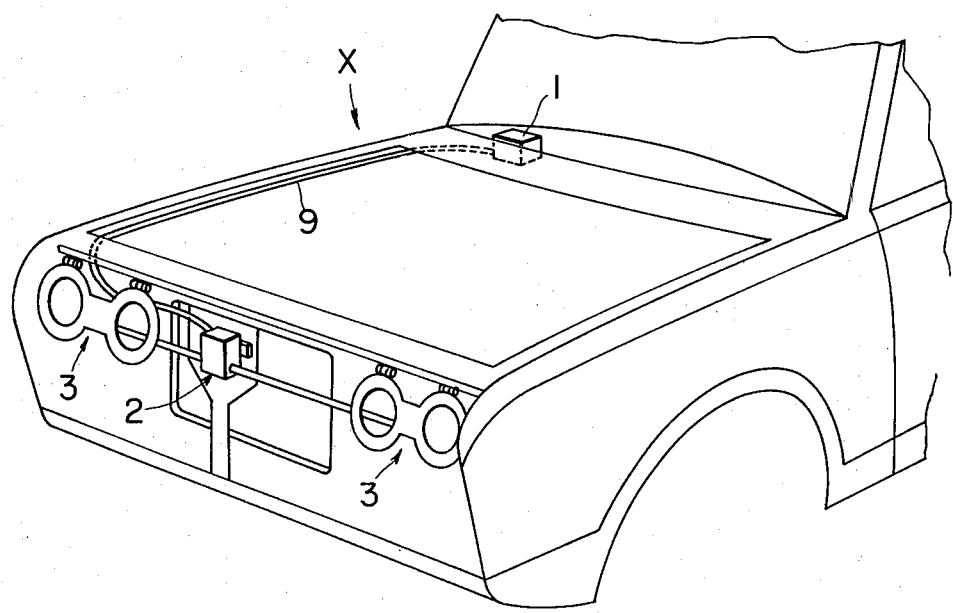
FIG. 1 is a fragmentary perspective view of an automobile installed with a headlight beam control system of the present invention.

Referring to the accompanying drawings FIG. 1 shows an automobile installed with a headlight beam control system which generally comprises a controller 1 mounted within a dashboard of the vehicle, an actuator 2 electrically connected to the controller 1, and mechanisms 3 to adjust headlight angularly to control a beam or an optical axis of each headlight.

Figure 2:
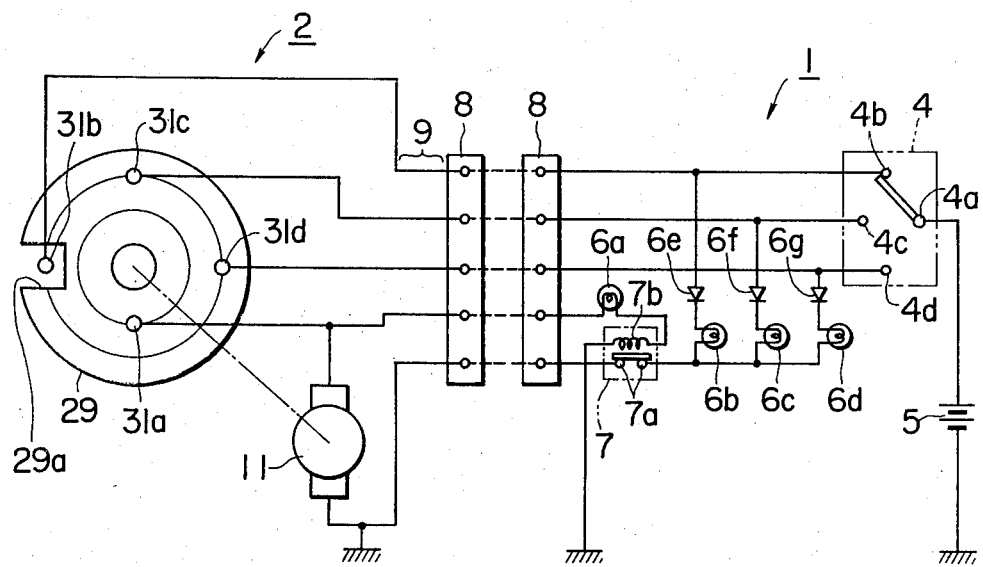
FIG. 2 is a circuit diagram having a manually operable controller and an actuator.

As shown in FIG. 2, the controller 1 comprises multi-contact selector switch (in this embodiment, a three-contact selector switch) 4 which is constructed in such a manner that an electrical contact 4a can be selectively connected to any desired one of three electrical contacts 4b, 4c and 4d with manual operation. The contact 4a is connected to one terminal of a battery 5 whose other terminal is grounded, whereas connected to the contacts 4b, 4c and 4d are one terminals of indicator lamps 6b, 6c and 6d, respectively, through respective diodes 6e, 6f and 6g. The other terminals of these lamps 6b, 6c and 6d are connected to a common ground line in which a pair of electrical contacts 7a of a normally closed relay 7 are connected in series. A relay coil 7b of the relay 7 is connected in series with another indicator lamp 6a. The controller 1 as constructed above is electrically connected to an electrical circuit of the actuator 2 through a connector 8 and a harness 9. Locations of the electrical contacts 4b, 4c and 4d relative to the electrical contact 4a are determined in such a manner that manipulating the selector 4 upwards will cause the optical axis of each headlight, to be directed towards the horizontal, whereas manipulating the selector 4 downwards will cause the optical axis of the headlight to be directed downwards.

Figure 3A:
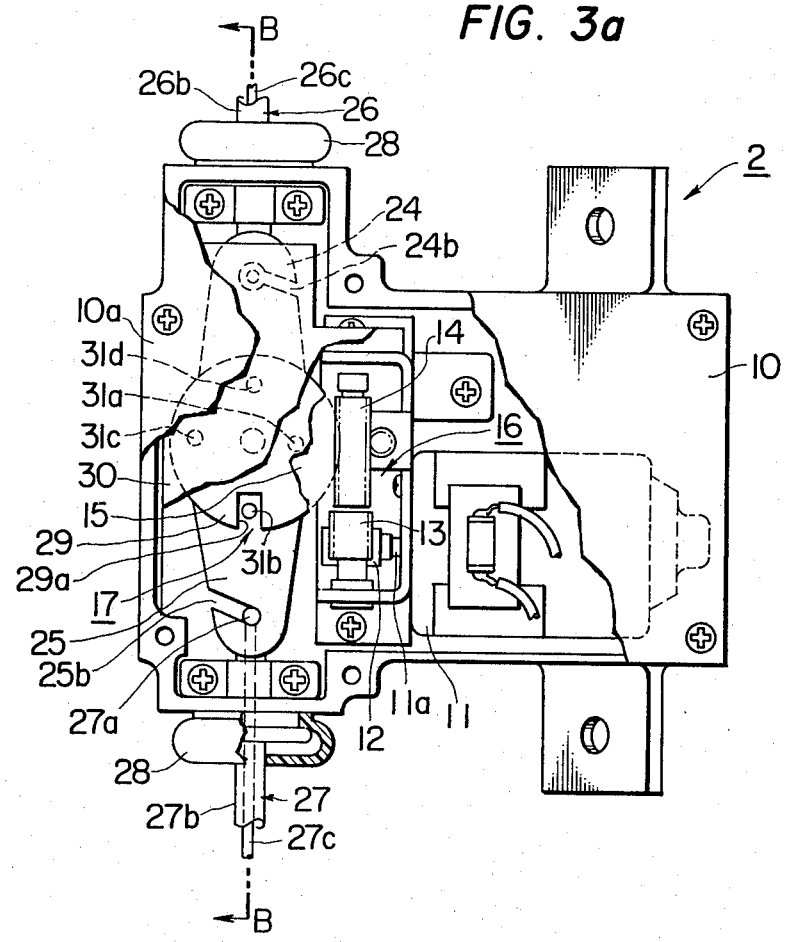
FIG. 3a is an end elevation, partially broken away, of the actuator.
Figure 3B:
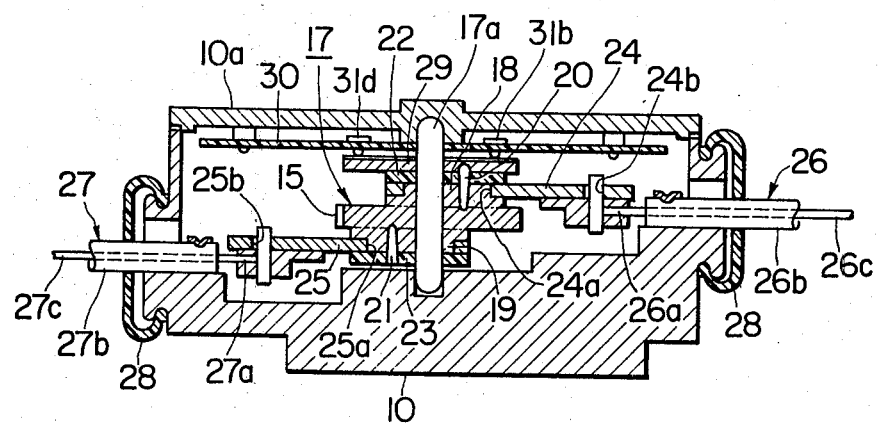

The actuator 2, as shown in FIGS. 3a and 3b, comprises a housing 10, a uni-directional motor 11 mounted within the housing 10, a helical gear 12 fixedly coupled with a drive or output shaft 11a of the motor 11, a mate helical gear 13 meshing with the helical gear 12, the rotational axis of the mate helical gear 13 being perpendicular to that of the helical gear 12, a worm gear 14 coaxially fixed to the mate helical gear 13, a worm wheel 15 meshing with the worm gear 14, and a rotary member generally designated by 17. The helical gears 12 and 13, the worm gear 14 and the worm wheel 15 constitute a gear train, generally designated by 16, for rotating the rotary member 17 about an axle 17a (see FIG. 3b).

The rotary member 17 comprises, as best seen in FIG. 3b, a disc section formed with the worm wheel 15, a rotary cam section 18 integrally formed on one side of the disc and another rotary cam section 19 integrally formed on the opposite side of the disc. The rotary cam sections 18 and 19 are offset from the axis of the disc and displaced angularly from each other 180 degrees. With a stud pin 20, a spacer 22 is affixed to the rotary cam section 18, whereas with a stud pin 21 a spacer 23 to the rotary cam section 19. Cooperating with the rotary cam section 18 is a cam follower 24, whereas with the rotary cam section 19 a cam follower 25. These cam followers are held in cooperative relation with the respective cam sections 18 and 19 with the help of respective spacers 22 and 23.

Figure 5A:
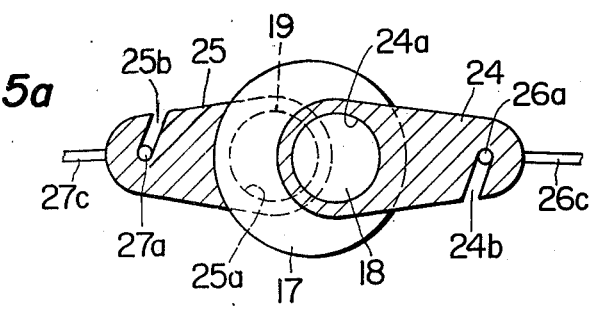
FIGS. 5a-5c are views showing three different relative positions between the cam and its cam followers in three different modes visualized in FIG. 6.
Figure 5B:
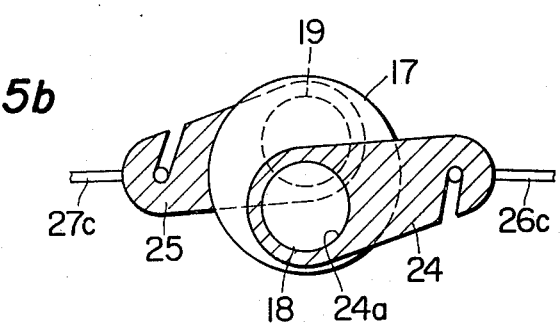
Figure 5C:
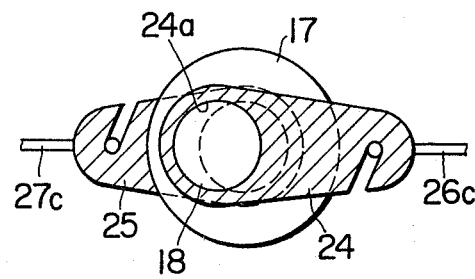

The cam follower 24, as best seen in FIGS. 5a to 5c, is rotatably coupled with the rotary cam section 18 with an aperture 24a formed through one end portion thereof, whereas the cam follower 25 with the cam section 19 with an aperture 25a formed through one end portion thereof. As the rotary member 17 rotates, the cam followers 24 and 25 will reciprocate. The cam followers 24 and 25 are formed at their opposite end portions with engaging notches 24b and 25b, respectively, in which end sections 26a and 27a of wires 26 and 27 engage, respectively. The wires 26 and 27 extend outwardly from the housing 10 in the opposite directions. The wires 26 and 27 comprise outer tubes 26b and 27b, respectively, fixed to the housing or some portion of a vehicle, and inner wires 26c and 27c, respectively, which are operatively connected to the cam followers 24 and 25, respectively, to reciprocally and slidably move within the outer tubes 26b and 27b as the rotary member 17 rotates. Designated by 28 are seal boots.

Securely connected to the spacer 22 is a contact disc 29 made of an electrically conductive material. The contact disc 29 is coaxial with the disc section of the rotary member 17 for rotation about the axle 17a, and arranged to be in slidable engagement with electrical contacts 31a, 31b, 31c, and 31d which are disposed on a support plate 30, of an insulating material, attached to a lid 10a for the housing 10. As best seen in FIGS. 2 and 3, the contact disc 29 is formed with a peripheral notch 29a, whereas the electrical contact 31a is located within an area disposed radially inwardly, with respect to the contact disc 29, of the other three electrical contacts 31b, 31c, and 31d so that the contact 31a is in sliding engagement with the contact disc 29 at all times. The other three contacts 31b, 31c, and 31d are located within an area through which the notch 29a will pass as the contact disc 29 rotates and they are angularly spaced from each other so that when the notch 29a comes to align with one of the contacts 31b, 31c, and 31d, the one contact will be disengaged from the contact disc 29, that is, the one contact will be insulated from the contact 31a which is at all times slidably engaged by the contact disc 29.

This contact 31a is connected to one terminal of the motor 11 and also to one terminal of the indicator lamp 6a, whose other terminal is connected to the coil 7b, through the connector 8, whereas the other three contacts 31b, 31c, and 31d are connected to the three electrical contacts 4b, 4c, and 4d of the selector, respectively. The other terminal of the motor 11 is grounded in a known manner.

Figure 4:
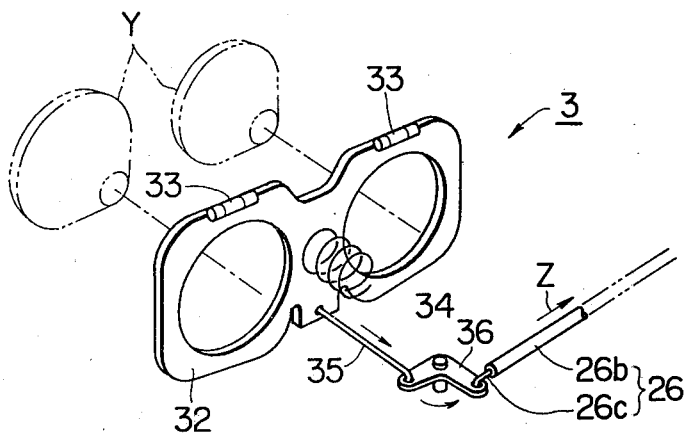
FIG. 4 is a diagram showing a mechanism to angularly adjust a headlight assembly.

Each of the mechanisms 3 comprises a hingedly mounted pivotal support member 32 to which a pair of headlights Y (shown in FIG. 4 being a left headlight assembly) are mounted, so that moving the support member 32 about its hinged portions 33 (a pivot axis) will cause the direction of the optical axis of each headlight to be varied. A spring 34 biases the support member 32 in a direction to vary the direction of the optical axis of each headlight toward the horizontal. The support member 32 is operatively connected to the inner wires 26c through a suitable linkage including a rod or wire 35 and a bell crank lever 36. One arm of the bell crank lever 36 is connected to the rod 35, whereas the other arm of the bell crank lever 36 to the wire 26c. Pulling the inner wire 26c in a direction of an arrow Z shown in FIG. 4 will cause the rod 35 to move the support member 32 about the pivot axis, against the bias of the bias spring 34 in a direction to direct the optical axis of each headlight downwards, that is; away from the horizontal. A similar mechanism is used for a right headlight assembly.

The operation of the headlight beam control system as described above will be described hereinafter.

Figure 6:
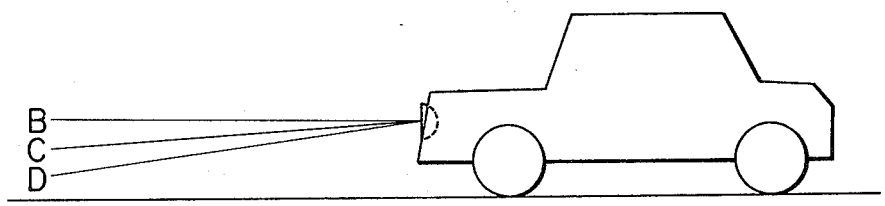
FIG. 6 is a diagram showing beam angles corresponding to the three modes.

With the switch 4 being in the illustrated position in FIG. 2, the contact 4b is connected to positive side of the battery 5, the contact disc 29 is in the illustrated position in FIG. 2 and the rotary cam sections 18 and 19 and their followers 24 and 25 are in the illustrated positions in FIG. 5a. Under this condition no current flows through the relay coil 7b because the contact 31b aligns with the notch 29a and is electrically insulated from the contact 31a and thus the relay contacts 7a remain closed as shown in FIG. 2. Since the relay contacts 7a are closed, current flows through the indicator lamp 6b to illuminate the same. Since the cam followers 24 and 25 stretch fully in the illustrated position in FIG. 5a to fully extend the inner cables 26c and 27c, each headlight is adjusted to a B-mode position (see FIG. 6) in which the optical axis of each headlight is given the most elevated position.

When now the selector switch 4 is manipulated to connect the contact 4c with contact 4a, current will flow through the motor 11 via the contacts 4a, 4c, 31c, the contact disc 29, and the contact 31a to start the motor 11, thus rotating the contact disc 29 clockwise (viewing in FIG. 2). The motor 11 and the contact disc 29 will rotate until the notch 29a comes into alignment with the contact 31c when electrical connection between the contact 31c and the contact 31a breakes up to stop flow of current through the motor 11. As long as the contact disc 29 is rotated, current will flow through the lamp 6a and the relay coil 7b to illuminate the lamp 6a and energize the relay coil 7b, but since the relay contacts 7a are opened upon energization of the relay coil 7b, the other three indicator lamps 6b, 6c and 6d are not illuminated. Upon termination of this rotation of the contact disc 29, the indicator lamp 6a cuts off, but the relay coil 7b is deenergized to close the relay contacts 7a again, so current will flow through the indicator lamp 6c via the contacts 4a, 4c, diode 6f to illuminate the lamp 6c. Therefore, illumination of the indicator lamp 6c means that the rotary cam sections 18 and 19 and their cam followers 24 and 25 are in the positions illustrated in FIG. 5b. Rotation of the cam sections 18 and 19 from their positions illustrated in FIG. 5a toward the position illustrated in FIG. 5b will put their cam followers 24 and 25 toward each other thus pulling the inner wires 26c and 27c toward the longitudinal center line of the vehicle X (see FIG. 1). As a result, the inner wires 26c and 27c pull the rod 35, against the force of the spring 34, through the bell crank lever 36, rotating the support member 32 about the pivot axis toward a C-mode position (see FIG. 6) in which the optical axis is given an intermediate position.

When the selector switch 4 is manipulated to connect the contact 4d with the contact 4a, the motor 11 is energized to rotate the contact disc 29 and the rotary member 17 until the notch 29a comes to align with the contact 31d and the rotary member 17 takes the position illustrated in FIG. 5c. Rotation of the cam sections 18 and 19 when the rotary member 17 rotates from the position illustrated in FIG. 5b toward the position illustrated in FIG. 5c will cause the cam followers to further pull the inner wires 26c and 27c toward each other rotating the support frame 32 to a D-mode position (see FIG. 6) in which the optical axis of each headlight is given the lowest position.

When the contacts 4a and 4b are connected again, the rotary member 17 and the contact disc 29 will rotate to reassume the illustrated position in FIG. 2 and the position shown in FIG. 5a. As a result, the inner wires 26c and 27c are extended again to permit the spring 34 to rotate the support 32 toward the B-mode position.

Figure 7:
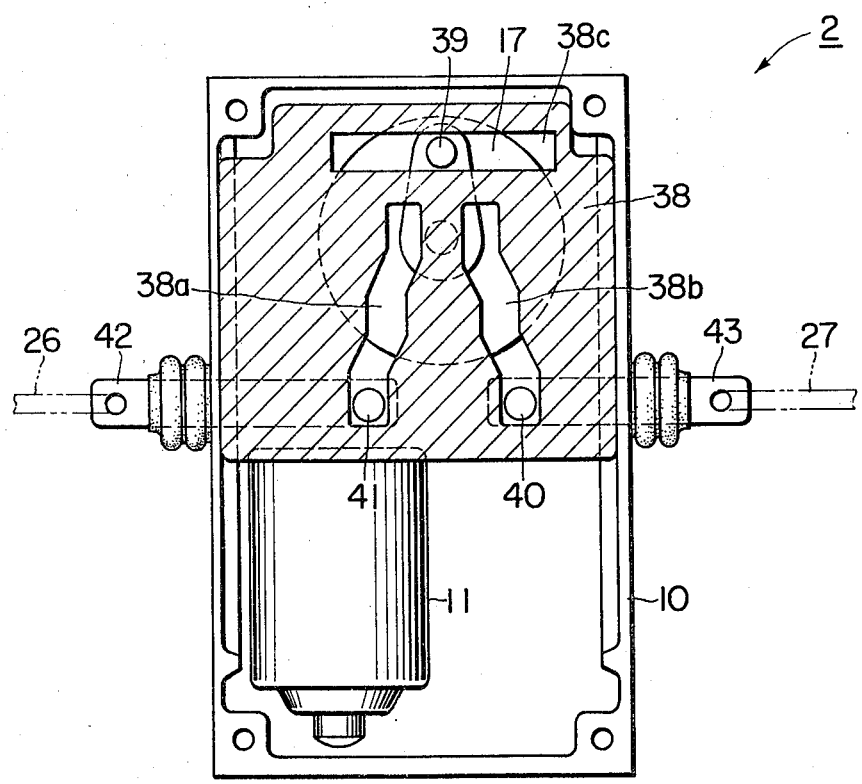
FIG. 7 is a similar view to FIG. 3a showing another embodiment of the invention.

FIG. 7 shows another embodiment which is different from the preceding embodiment in that instead of two offset rotor cam sections 18 and 19 secured to both sides of the rotary member 17 and their cam followers 24 and 25, an offset pin 39 secured to a rotary member 17, a reciprocably movable cam plate 38 and cam followers, in the form of pins 40 and 41, constitute a cam mechanism to control extension of inner wires 26 and 27 in response to rotational movement of the rotary member 17. The cam follower pins 40 and 41 are linked to the inner wires 26 and 27, respectively, by means of respective connecting rods or members 42 and 43.

Figure 8A:
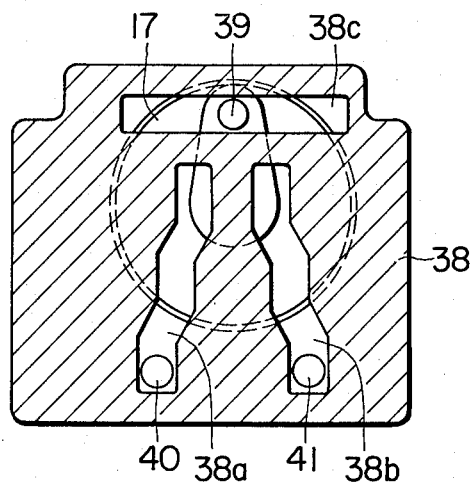
FIGS. 8a-8c are similar views to FIGS. 5a-5c, respectively, showing three different relative positions of the cam and its cam followers shown in FIG. 7.
Figure 8B:
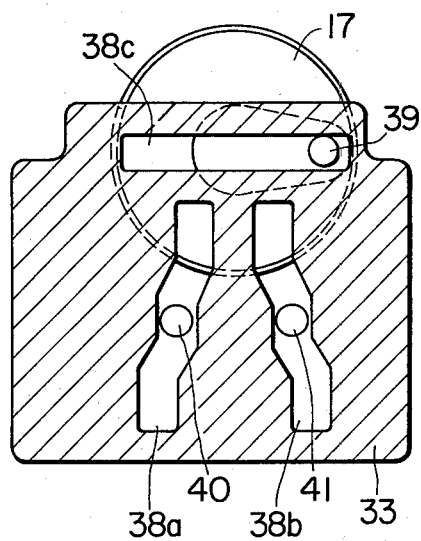
Figure 8C:
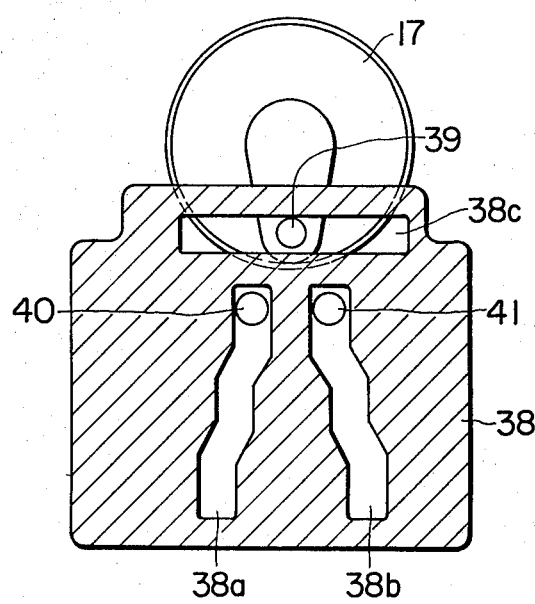

Explaining more in detail, the cam plate 38 is reciprocably movably mounted within a housing 10 and has formed therein two grooves 38a and 38b for receiving the follower pins 41 and 40, respectively, and a laterally extending groove 38c, with respect to the direction of the reciprocal movement of the cam plate 38, for receiving the offset pin 39. The grooves 38a and 38b are configured such that as the cam plate 38 moves from the position shown in FIG. 8a towards the position shown in FIG. 8c via the position shown in FIG. 8b in response to clockwise rotation of the rotary member (viewing in FIGS. 7, 8a to 8c, a space between the cam follower pins 40 and 41 will become narrower in three stages. Referring to FIGS. 8a to 8c, FIG. 8a shows the positions of the component parts of the cam mechanism when the system is in B-mode, FIG. 8b when the system is C-mode, and FIG. 8c when the system is D-mode.

In the two preceding embodiments, three stage control of the optical axis of the headlights is accomplished. It is possible to increase or decrease the stages only by increasing or decreasing the contacts of a relay switch 4 of a controller 1 and by correspondingly increasing or decreasing contacts on the contact disc 29.

Although in the embodiments a bell crank lever 36 is used, any other means can be used as long as the reciprocal movements of the inner wires 26 and 27 are converted into pivotal movement of the support members 32 for the headlights.

We claim:

1. A motor vehichle comprising:
   a support having at least one headlamp secured thereto, said support being pivotally mounted on the vehicle;
   a motor with an output shaft, said motor rotating said output shaft in one rotational direction only when energized;
   cam means for converting rotation of said output shaft into a reciprocal movement;
   linkage means for transmitting the reciprocal movement to said support to pivot said support; and
   an electric circuit for energizing said motor, said electric circuit comprising:
   a first group of electrical contacts;
   a contact disc electrically connected in series with said motor;
   a second group of electrical contacts electrically connected in series with said first group of electrical contacts, respectively, said second group of electrical contacts being arranged to be in slidable engagement with said contact disc,
   said contact disc being operatively connected to said output shaft to be rotated thereby, said contact disc having means for insulating said second group of electrical contacts one after another from said contact disc as said contact disc rotates;
   manually operable means for selectively connecting one of said first group of electrical contacts to a source of electricity; said cam means comprising:
   a rotary member, to which said contact disc is concentrically connected, operatively connected to said output shaft of said motor to be rotated thereby in one rotational direction, said rotary member having an offset pin secured thereto;
   a reciprocably movable cam plate with respect to the axis of rotation of said rotary member, said cam plate having a laterally extending groove, with respect to the direction of the reciprocal movement of said cam plate, for slidably receiving said offset pin and a second groove; and
   a cam follower pin operatively connected to said linkage means, said cam follower pin being slidably received in said second groove, said second groove being configured such that as said cam plate moves in one direction said cam follower pin is moved inwardly of said cam plate.

2. In a vehicle having a source of electricity,
   first and second headlight supports, each pivotally mounted to the body of the vehicle and biased to rotate in one rotational direction by biasing means;
   a uni-directional electric motor having an output shaft;

a worm gear in drive connection with said output shaft for synchronous rotation therewith;

an axle rotatably supported substantially perpendicular to the longitudinal axis of said worm gear;

a disc fixedly mounted concentrically on said axle, said disc having teeth formed along the periphery thereof for meshing engagement with said worm gear;

a first cable and bell crank lever arrangement having one end connected to said first headlight support;

a first link formed at one end with a first aperture and at the other end with a second aperture which has a slot extending therefrom to the periphery of said first link and which is adapted to receive therein the other end of said first cable and bell crank lever arrangement, said slot defining an acute angle with a line interconnecting the centers of said first and second apertures formed in said first link;

a first projection formed on a first side of said disc which is eccentric with respect to said axle and through which said axle extends, said projection being received in said first aperture of said first link so that upon said disc being driven to rotate by said motor, said first link is caused to receiprocate;

a second cable and bell crank lever arrangement having one end connected to said second headlight support;

a second link formed at one end thereof with a first aperture and at the other end with a second aperture which has a slot extending therefrom to the periphery of said first link and which is adapted to receive therein the other end of said cable and bell crank lever arrangement, said slot defining an acute angle with a line which interconnects the centers of said first and second apertures formed in said second link;

a second projection formed on a second side of said disc which is eccentric with respect to said axle and through which said axle extends, said projection being received in said first aperture of said first link so that upon said disc being driven to rotate by said motor, said second link is caused to reciprocate;

circuit means for selectively connecting said motor to the source of electricity so that said first and second supports are caused to pivot and for disconnecting said motor from said source, including:

a contact disc fixedly mounted on said axle and electrically insulated from said axle and said disc, said contact disc having a first electrically conductive portion and a second electrically non-conductive portion;

a plurality of sliding contacts which slide on said contact disc, a first group of said sliding contacts being arranged to slide on said first portion and a second group which cyclically slide on said first and second portions in a manner that only one of said second group slides on said second portion at one time; and a manually operable switch having a plurality of stationary contacts each connected to one of said second group and a movable contact which can be set to contact a stationary contact which corresponds to one of said second group in contact with said first portion so that electricity flows between said one of said second group and said first group and said motor rotates said disc and said contact disc until said second portion comes into contact with said one of said second group whereupon said source is disconnected from said motor.

* * * * *